US007017056B1

(12) United States Patent
Lettang et al.

(10) Patent No.: US 7,017,056 B1
(45) Date of Patent: Mar. 21, 2006

(54) METHOD AND APPARATUS FOR SECURE REMOTE CONTROL OF POWER-ON STATE FOR COMPUTERS

(75) Inventors: Frank John Lettang, Fort Collins, CO (US); Joel Lefebvre, Ft. Collins, CO (US); Stephen D. Scheid, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 728 days.

(21) Appl. No.: 09/628,920

(22) Filed: Jul. 31, 2000

(51) Int. Cl.
*G06F 1/26* (2006.01)
*G06F 1/28* (2006.01)
*G06F 1/30* (2006.01)

(52) U.S. Cl. .................... 713/310; 713/300; 713/320; 713/322; 713/323; 713/324

(58) Field of Classification Search ............. 713/300, 713/310, 320, 323, 324, 322
See application file for complete search history.

(56) References Cited

U.S. PATENT DOCUMENTS

| | | | |
|---|---|---|---|
| 3,680,057 A | 7/1972 | Blessin et al. | |
| 5,191,323 A | 3/1993 | Abbes et al. | 340/825.37 |
| 5,263,054 A | 11/1993 | Davis et al. | |
| 5,315,622 A | 5/1994 | Abbiate et al. | |
| 5,377,114 A * | 12/1994 | Gross | 705/413 |
| 5,548,781 A * | 8/1996 | Huang | 710/11 |
| 5,557,539 A * | 9/1996 | Fitch | 709/206 |
| 5,588,054 A * | 12/1996 | Shin et al. | 379/413 |
| 5,627,858 A | 5/1997 | Mak et al. | |
| 5,664,204 A * | 9/1997 | Wang | 713/300 |
| 5,781,598 A | 7/1998 | Hardy, III | |
| 5,809,118 A * | 9/1998 | Carmello et al. | 379/102.02 |
| 5,918,059 A * | 6/1999 | Tavallaei et al. | 713/300 |
| 5,958,055 A * | 9/1999 | Evoy et al. | 713/310 |
| 6,031,867 A * | 2/2000 | Johnson et al. | 375/222 |
| 6,072,827 A | 6/2000 | Krulce | |
| 6,115,824 A * | 9/2000 | Ha | 713/330 |
| 6,157,689 A | 12/2000 | Petty et al. | |
| 6,163,586 A | 12/2000 | Hongbin Hao et al. | |
| 6,167,379 A * | 12/2000 | Dean et al. | 705/9 |
| 6,263,033 B1 | 7/2001 | Hansen | |
| 6,266,776 B1 * | 7/2001 | Sakai | 713/300 |

(Continued)

FOREIGN PATENT DOCUMENTS

JP          08328681 A   * 12/1996

OTHER PUBLICATIONS

"80C31BH/80C51BH/87C51 MCS 51 CHMOS Single-chip 8-bit Microcontroller", Intel Corporation, 1995, pp. 1-16.*

(Continued)

*Primary Examiner*—Lynne H. Browne
*Assistant Examiner*—James K. Trujillo
(74) *Attorney, Agent, or Firm*—Kevin M. Hart

(57) ABSTRACT

A secure mechanism for remotely controlling the power-on state of a host computer: A microcontroller in the host computer is supplied with standby power even when system power to the host computer is turned off. The microcontroller senses the state of the host computer's RS-232 receive line so that commands may be sent to the microcontroller over an RS-232 connection to the host computer. An output of the microcontroller is logically ORed with the output of a power switch debounce circuit of the host computer. The output of the logical OR function is used to manipulate the power-on state of the host computer. The microcontroller may be programmed to respond to numerous commands.

24 Claims, 2 Drawing Sheets

U.S. PATENT DOCUMENTS

| | | | |
|---|---|---|---|
| 6,269,288 B1 * | 7/2001 | Smith ........................ 713/310 |
| 6,292,711 B1 * | 9/2001 | LaDue ........................ 700/241 |
| 6,332,173 B1 | 12/2001 | Typaldos |
| 6,366,610 B1 | 4/2002 | Loyer et al. |
| 6,366,632 B1 | 4/2002 | Noh |
| 6,453,423 B1 * | 9/2002 | Loison ........................ 713/310 |
| 6,529,548 B1 | 3/2003 | Aoki et al. |
| 6,546,616 B1 | 4/2003 | Radowick |
| 6,553,499 B1 * | 4/2003 | Weigold et al. ............ 713/300 |
| 6,571,333 B1 * | 5/2003 | Jain et al. ........................ 713/2 |
| 6,587,951 B1 * | 7/2003 | Flanigan ........................ 713/310 |
| 6,591,368 B1 * | 7/2003 | Ryu ........................ 713/323 |

OTHER PUBLICATIONS

Horowitz, P. and Hill, W., "The Art of Electronics", Second Edition, 1995, Cambridge University Press, pp. 506-507.*

* cited by examiner

120
METHOD AND APPARATUS FOR SECURE REMOTE CONTROL OF POWER-ON STATE FOR COMPUTERS

FIELD OF THE INVENTION

This invention relates generally to the remote control of computer systems. More particularly, the invention relates to techniques for remotely controlling the power-on and power-off states of individual computers.

BACKGROUND

Multiple individual computers are frequently ganged together for commercial uses of various kinds. For example, network "server farms" commonly include numerous racks of individual computers, each rack populated by several rack-mounted network server computers. In such an environment, it is desirable for a system administrator to be able to control certain functions and states of the individual computers remotely. In particular, it is desirable for a system administrator to be able to remotely control whether an individual computer is powered-on or powered-off.

One prior art method that has been employed to remotely control the power-on state of individual computers has been to use a local area network ("LAN") connection. For example, a multiaccess computing ("MAC") address can be used to select an individual machine using a LAN and to cause the machine to power itself on when its MAC address is detected. Solutions according to this scheme are sometimes referred to as "wake on LAN" solutions. Unfortunately, such solutions lack flexibility: The simple ability to power a machine on remotely is not as useful as the ability to turn it on and off, and to be able to specify the manner in which the machine turns off. (For example, it is sometimes desirable to specify a "soft" power down wherein the machine ends running processes in a controlled manner. At other times, it is desirable to specify a "hard" power down wherein the machine simply stops immediately.) Although other MAC address/LAN techniques have been employed having greater flexibility and features, these more elaborate solutions typically require more than one MAC or IP address per machine. The use of multiple addresses results in significantly higher implementation cost and complexity.

Moreover, MAC address/LAN techniques lack security: Almost by definition, the use of a LAN means that multiple users will have access to the individual machines that are connected to the LAN. In such an environment, the MAC addresses for the individual machines will be readily available to users. Therefore, it would be possible for the power-on state of an individual machine to be altered either by mistake or maliciously; either possibility is undesirable.

It is therefore an object of the invention to provide a flexible and secure mechanism for controlling the power-on state of individual computers remotely.

SUMMARY OF THE INVENTION

These and other objects are realized by a secure mechanism for remotely controlling the power-on state of a computer.

In one aspect, a microcontroller is added to the computer that will be remotely controlled. The microcontroller is supplied with power via a standby power supply even when power to the host computer is turned off. The microcontroller senses the state of the host computer's RS-232 receive line so that commands may be sent to the microcontroller over an RS-232 connection to the host computer. An output of the microcontroller is logically ORed with the output of a power switch debounce circuit of the host computer. The output of the logical OR function is used to control the power-on state of the host computer.

In another aspect, the microcontroller may be programmed to respond to numerous commands related to the power-on state of the host computer. For example, a first command may be used to turn the host computer on immediately. A second command may be used to turn the host computer off immediately. A third command may be used to cause the host computer to execute a "soft" power down wherein all processes are exited prior to turning off power. And a fourth command may be used to place the microcontroller in a sleep mode. Numerous other command features are possible.

In still another aspect, multiple such host computers may be coupled to a system console using independent RS-232 connections. In this manner, a system administrator may remotely control the power-on state of each host computer individually.

The remote control mechanism of the invention provides flexibility because many different command sequences may be transmitted over the RS-232 connections. The mechanism is secure because each host computer's power-on state is controlled using an independent RS-232 connection rather than by using the LAN; RS-232 connections are not easily accessed by unauthorized users. Moreover, the mechanism is inexpensive because it utilizes RS-232 hardware rather than more expensive LAN hardware. The mechanism may be used to control a single computer or may be scaled to control a large set of computers.

DETAILED DESCRIPTION OF THE PREFERRED EMBODIMENTS

Structure. Preferred structure for implementing the invention will now be described with reference to FIGS. 1–3.

Figure 1:
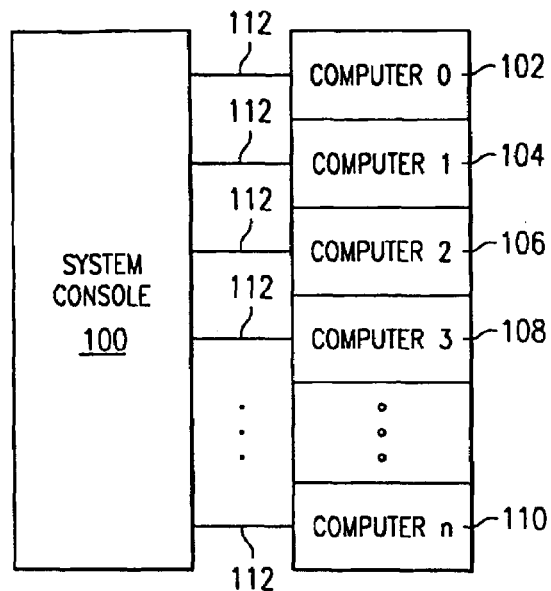
FIG. 1 is a block diagram illustrating a system console coupled to multiple remote computers with independent RS-232 connections according to a preferred embodiment of the invention.

FIG. 1 illustrates a system console 100 coupled to multiple remote computers 102–110 with independent RS-232 connections 112 according to a preferred embodiment of the invention. One RS-232 connection is provided for each of the remote computers to be controlled from console 100. Prior art software may be executed on console 100 making the console operable to issue user-typed commands to the remote computers independently over the appropriate RS-232 connections.

Figure 2:
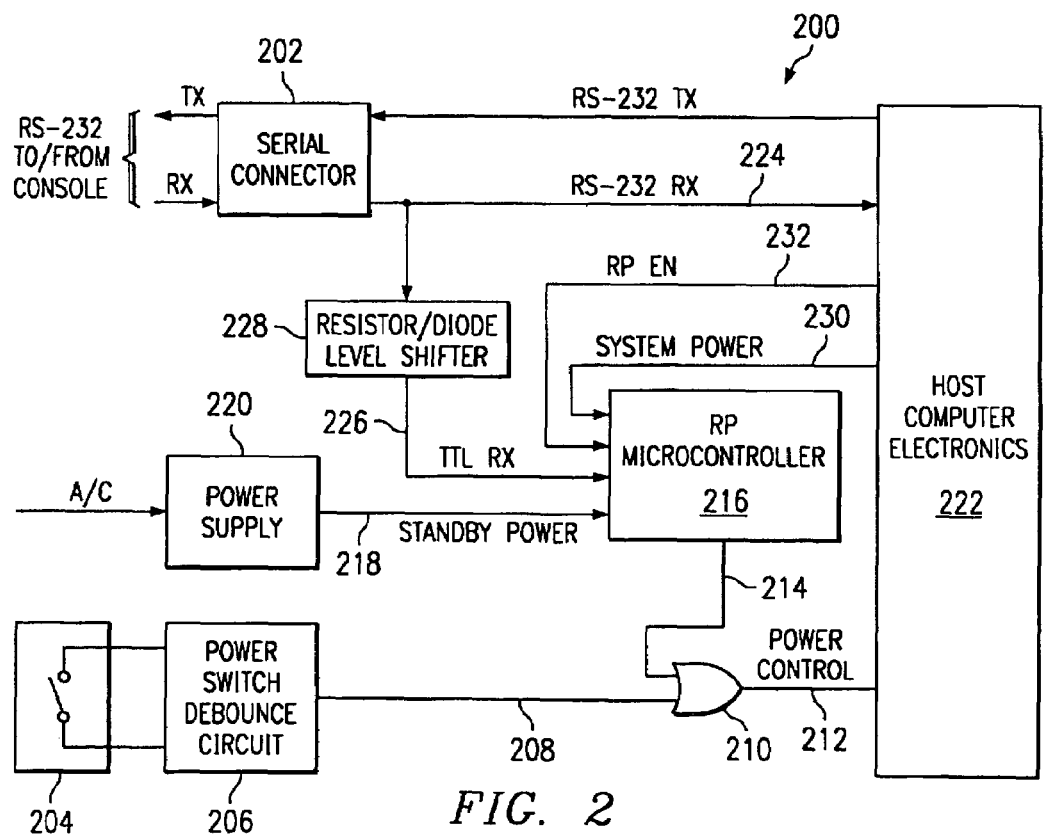
FIG. 2 is a block diagram illustrating a representative one of the multiple remote computers of FIG. 1.

FIG. 2 illustrates a representative one of the multiple remote computers of FIG. 1. Computer 200 has an RS-232 port terminated at serial connector 202. Computer 200 also has a power switch 204 coupled to a power switch debounce circuit 206. Debounce circuit 206 presents a debounced output signal 208 to one of the inputs of OR gate 210. The output of OR gate 210 constitutes a power control signal 212 which is used to manipulate the power-on state of computer 200 in a manner to described in more detail below. The other input of OR gate 210 is provided by a power control output 214 of microcontroller 216. Using this arrangement, power control signal 212 may be asserted either by power switch debounce circuit 206 or by microcontroller 216.

Microcontroller 216 is supplied with continuous standby power 218 via power supply 220 even when system power to host computer electronics 222 is turned off. Microcontroller 216 senses the state of RS-232 receive line 224 via TTL RX input 226. (TTL RX input 226 follows the state of RS-232 receive line 224, but is clamped to TTL logic levels by resistor/diode level shifter 228.) Microcontroller 216 also has an input coupled to host computer system power 230, and another input coupled to remote power enable (RP EN) signal 232. Preferably, the state of system power input 230 should reflect whether the host computer power is on or off. The state of RP EN input 232 should reflect the state of a firmware enable bit within host computer electronics 222. Such a firmware enable bit may be allocated by conventional means, and may be set/reset during boot-up of computer 200 also by conventional means.

Figure 3:
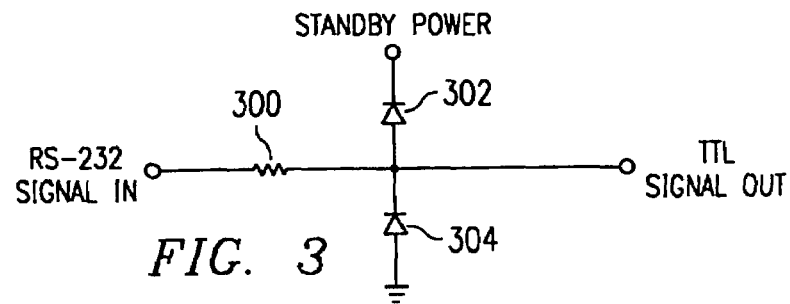
FIG. 3 is a schematic diagram illustrating the resistor/diode level shifter of FIG. 2 in more detail.

FIG. 3 is a schematic diagram illustrating the resistor/diode level shifter of FIG. 2 in more detail. The level shifter may simply constitute a series resistor 300 and a pair of diodes 302, 304 configured as shown. The circuit is operable to clamp a high 10. RS-232 voltage to the standby power voltage, and to clamp a low RS-232 voltage to ground. Other suitable level shifters may be used. Alternatively, a microcontroller may be used that has the ability to accept RS-232 voltage levels on its inputs.

Figure 4:
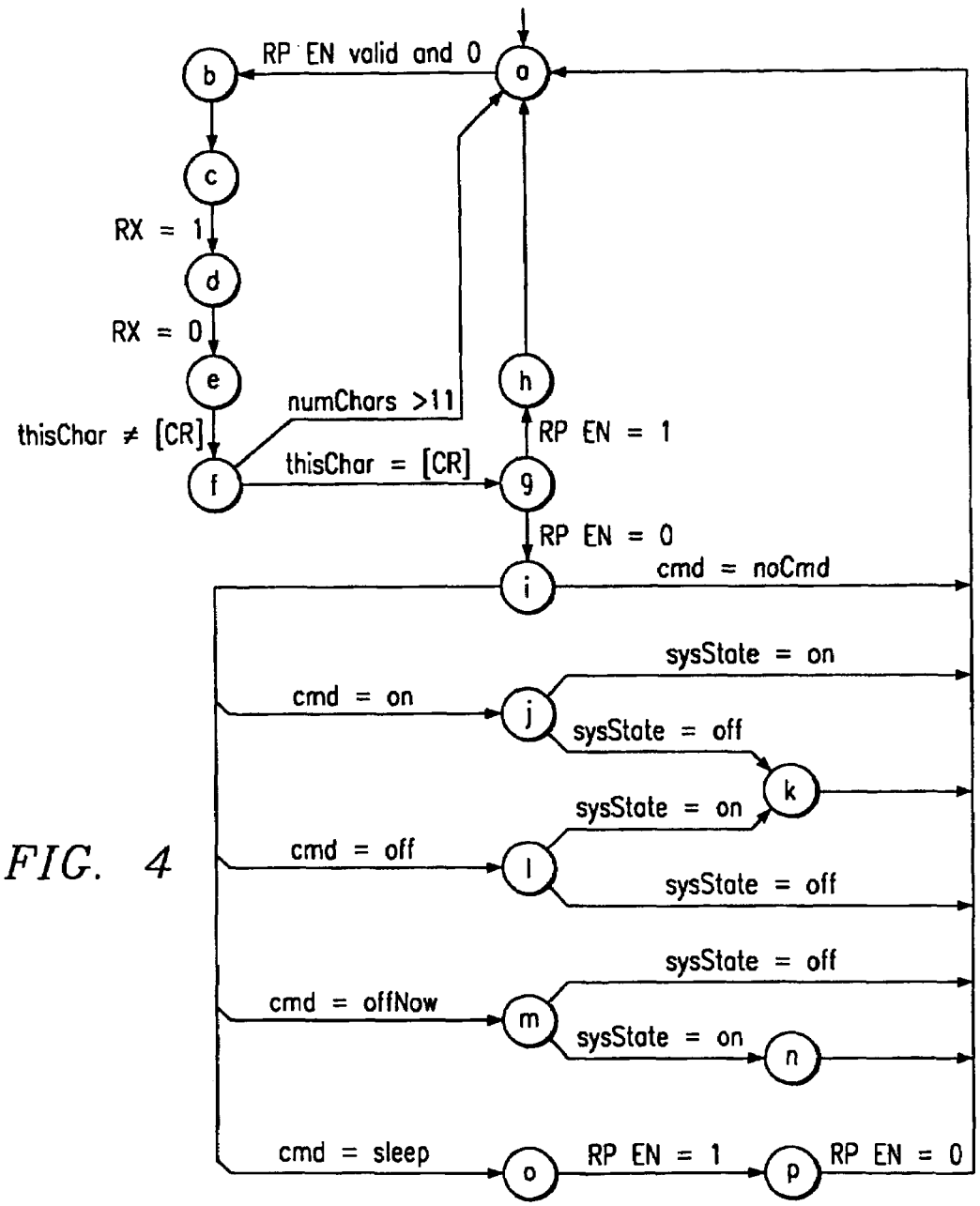
FIG. 4 is a state diagram illustrating preferred behavior for the microcontroller of FIG. 2.

Operation. Preferred operation of the invention will now be described with reference to the state diagram of FIG. 4.

Initialization. On standby power-up or reset, software running on microcontroller 216 initializes to state A and sets an internal "microcontroller on" (MCON) state bit to 1. When RP EN is determined to be valid (not tristated or indeterminate) and 0, software transitions to states B through F, wherein the RS-232 baud rate is automatically detected and characters are clocked into a receive buffer. NOTE: RP EN is not valid when system power to the host computer is not turned on. In an embodiment, the microcontroller was programmed to transition to state B regardless of the state of the RP EN bit when standby power was first turned on; this allowed the remote power-on functionality to be available upon reset even though system power had not yet been turned on. Thereafter, the state of the MCON bit was checked every time state A was entered; thus the MCON bit effectively "remembered" the state of the RP EN bit of the host computer.

Auto Baud Rate Detect and Character Receipt. In state B, a receive buffer is cleared, a variable numChars is set to 0, and a variable cmdMode is set to 0. Software then transitions to state C. Once in state C, the state of the TTL RX input is monitored. As soon as TTL RX goes high, a timer or counter is initiated and software transitions to state D. In state D, TTL RX is again monitored. As soon as TTL RX goes low, the timer or counter will be stopped and software transitions to state E.

The software is designed to assume that, once state E has been reached, the value of the timer or counter will reflect the duration of a start bit. Thus, in state E, the baud rate is set according to the value of the timer or counter. Preferably, the user 1 should enter carriage returns (<CR>) at console 100 in order to establish the baud rate, as the <CR> character guarantees a start bit of 1 followed immediately by a 0. While in state E, and after the baud rate has been set, software clocks one character following the start bit into the receive buffer. If the received character was a <CR>, then software will continue looping in state E and will set the baud rate again. (Alternatively, the software may transition from state E to states A, B or C to re-determine the baud rate.) But if the character was anything other than <CR>, software will set the variable cmdMode to 1 and transition to state F.

In state F, software places the just-received character into the receive buffer and increments the numChars variable. Software will remain in state F clocking additional characters into the receive buffer and incrementing numChars until either numChars exceeds 11 characters or until a <CR> is encountered. If the terminating condition was numChars>11, software resets to state A. But if the terminating condition was a <CR>, then software transitions to state G.

Once in state G, software checks the state of the RP EN bit to determine whether remote power-on functionality has been disabled. If the RP EN bit is 1 (indicating a disable condition), then software will transition to state H. In state H, the MCON state variable is reset to 0, and software resets to state A. On the other hand, if RP EN is 0 (indicating an enable condition), software transitions to state I, wherein the just-received command will be interpreted.

Command Processing. In state I, software examines the contents of the receive buffer and acts accordingly: If the contents indicate an illegal, unrecognized, or "no command," software resets to state A. But if the contents indicate one of a predetermined number of recognized commands, software will transition to a state determined by the command as follows.

On Command: If the buffer contents indicate an "on" command, software transitions from state I to state J. In state J, the value of system power line 230 (sysState) is tested to determine the current power-on state of the host computer. If sysState is 1, then the host computer is powered on already an no action is necessary. Therefore, software resets to state A. But if sysState is 0, then software transitions to state K. In state K, microcontroller 214 asserts power control output 214 for a predetermined time and then unasserts the signal. The state of power control input 212 will follow the pulse applied to output 214 and will cause system power to be turned on. The duration of the necessary pulse on power control input 212 will vary with the characteristics of host computer electronics 222. After asserting output 214 for the necessary interval, software resets to state A.

Off Command: If the buffer contents indicate an "off" command, software transitions from state I to state L. In state L, the value of system power line 230 (sysState) is tested to determine the current power-on state of the host computer. If sysState is 0, then the host computer is powered off already an no action is necessary. Therefore, software resets to state A. But if sysState is 1, then software transitions to state K. In state K, microcontroller 214 asserts power control output 214 for a predetermined time and then unasserts the signal. The state of power control input 212 will follow the pulse applied to output 214 and will cause system power to be turned off. The duration of the necessary pulse on power control input 212 will vary with the characteristics of host computer electronics 222. After asserting output 214 for the necessary interval, software resets to state A.

OffNow Command: If the buffer contents indicate an "OffNow" command, software transitions from state I to state M. In state M, the value of system power line 230 (sysState) is tested to determine the current power-on state of the host computer. If sysState is 0, then the host computer is powered off already an no action is necessary. Therefore, software resets to state A. But if sysState is 1, then software transitions to state N. In state N, microcontroller 214 asserts power control output 214 for a longer predetermined time and then unasserts the signal. Preferably, host computer electronics 222 will interpret the longer pulse on power control input 212 to mean that system power should be turned off immediately, without waiting for all processes to be terminated in a controlled manner. The state of power control input 212 will follow the pulse applied to output 214 and will cause system power to be turned off. The duration of the necessary pulse on power control input 212 will vary with the characteristics of host computer electronics 222. After asserting output 214 for the necessary interval, software resets to state A.

Sleep Command: Preferably, it should be possible to disable the above-described remote power-on functionality in a selected host computer by issuing a "sleep" command from console 100. The result of the sleep command should be to cause the selected host computer to cease interpreting RS-232 inputs as possible power-on or power-off commands. Thus, if the buffer contents indicate a "sleep" command, software transitions from state I to state O. In state O, software will perpetually loop until the state of RP EN is sensed to be 1 (indicating a disable condition). Once this occurs, software will transition to state P where it will perpetually loop until the state of RP EN is sensed to be 0 (indicating an enable condition). Once this occurs, software will reset to state A. While in either of states O or P, software will not be responding to new inputs on RS-232 receive line 224; thus, the remote power-on functionality will effectively be sleeping. But if the user desires to restore remote power-on functionality, he may do so by setting and then resetting the state of the RP EN bit (such as by rebooting the host computer to access its firmware configuration).

While the invention has been described in detail in relation to a preferred embodiment thereof, the described embodiment has been presented by way of example and not by way of limitation. It will be understood by those skilled in the art that various changes may be made in the form and details of the described embodiment without deviating from the spirit and scope of the invention as defined by the appended claims.

We claim:

1. A mechanism for remotely controlling the power-on state of a host computer, comprising:
    an RS-232 receive line on the host computer;
    a power switch debounce circuit on the host computer, the debounce circuit having a debounced output;
    a power control input on the host computer; and
    a microcontroller having a power control output and having an input configured to sense the state of the RS-232 receive line;
    wherein the power control input on the host computer is driven by the logical OR of the power control output and the debounced output, and wherein the microcontroller is operable to detect commands on the RS-232 receive line and to vary the state of the power control output responsive to the detected commands.

2. The mechanism of claim 1, wherein the microcontroller is operable to detect a power-on command on the RS-232 receive line and to use the power control output to turn power to the host computer on responsive to the power-on command.

3. The mechanism of claim 2, wherein the power-on command is executed by changing the state of the power control output for a predetermined time period.

4. The mechanism of claim 1, wherein the microcontroller is operable to detect a power-off command on the RS-232 receive line and to use the power control output to turn power to the host computer off responsive to the power-off command.

5. The mechanism of claim 4, wherein the power-off command is executed by changing the state of the power control output for a predetermined time period.

6. The mechanism of claim 1, wherein the microcontroller is operable to detect a power-off-now command on the RS-232 receive line and to use the power control output to turn power to the host computer off immediately responsive to the power-off-now command.

7. The mechanism of claim 6, wherein the power-off-now command is executed by changing the state of the power control output for a predetermined time period.

8. The mechanism of claim 1, wherein the microcontroller is operable to detect a sleep command on the RS-232 receive line and, responsive to the sleep command, to cease responding to further commands appearing on the RS-232 receive line.

9. The mechanism of claim 8, wherein the host computer further comprises a remote power enable bit, and wherein the microcontroller if sleeping is operable to resume responding to commands appearing on the RS-232 receive line responsive to a change in the state of the remote power enable bit.

10. The mechanism of claim 1, further comprising:
    a plurality of additional host computers, each having at least the attributes of the host computer of claim 1;
    a system console; and
    a plurality of independent RS-232 connections between the system console and the plural additional host computers;
    wherein the system console is operable to allow a system console user to direct commands to the microcontrollers of the plural additional host computers independently using the plural RS-232 connections.

11. A method for remotely controlling the power-on state of a host computer, comprising the steps of:
    coupling a microcontroller input to an RS-232 receive line of the host computer;
    coupling the logical OR of a power control output of the microcontroller and an output of a power switch debounce circuit of the host computer to a power control input of the host computer; and
    controlling the power-on state of the host computer by sending commands to the microcontroller from a remote location using the RS-232 receive line and causing the microcontroller to manipulate the state of the power control output responsive to the commands.

12. The method of claim 11, wherein the microcontroller is operable to detect a power-on command on the RS-232 receive line and to use the power control output to turn power to the host computer on responsive to the power-on command.

13. The method of claim 12, wherein the power-on command is executed by changing the state of the power control output for a predetermined time period.

14. The method of claim 11, wherein the microcontroller is operable to detect a power-off command on the RS-232 receive line and to use the power control output to turn power to the host computer off responsive to the power-off command.

15. The method of claim 14, wherein the power-off command is executed by changing the state of the power control output for a predetermined time period.

16. The method of claim 11, wherein the microcontroller is operable to detect a power-off-now command on the RS-232 receive line and to use the power control output to turn power to the host computer off immediately responsive to the power-off-now command.

17. The method of claim 16, wherein the power-off-now command is executed by changing the state of the power control output for a predetermined time period.

18. The method of claim 11, wherein the microcontroller is operable to detect a sleep command on the RS-232 receive line and, responsive to the sleep command, to cease responding to further commands appearing on the RS-232 receive line.

19. The method of claim 18, wherein the host computer further comprises a remote power enable bit, and wherein the microcontroller if sleeping is operable to resume responding to commands appearing on the RS-232 receive line responsive to a change in the state of the remote power enable bit.

20. The method of claim 11, further comprising the steps of:
coupling a plurality of additional host computers, each having at least the attributes of the host computer of claim 11, to a system console using a plurality of independent RS-232 connections between the system console and the plural additional host computers; and
directing commands to the microcontrollers of the plural additional host computers independently using the plural RS-232 connections.

21. A mechanism for remotely controlling a power state of a host computer, comprising:
logic configured to be coupled to an RS-232 receive line for the host computer and further configured to detect commands communicated across the RS-232 receive line from a remote source;
logic configured to receive a power enable signal generated by the host computer; and
logic for generating a power control output that is based on both the detected commands and a state of the power enable signal.

22. The mechanism of claim 21 further comprising logic for generating a power control input for the host computer, the generated power control input being the logical OR of the power control output and an output of a manual power switch for the host computer.

23. The mechanism of claim 21 wherein the detected commands include at least three selected from the group consisting of:
an ON command, which instructs the mechanism to turn on the host computer, if it is currently not on;
an OFF command, which instructs the mechanism to turn the host computer off only after ending processes that are currently running;
an OFF NOW command, which instructs the mechanism to turn the host computer off immediately; and
a SLEEP command, which instructs the mechanism to stop monitoring future commands on the RS-232 receive line, until after a predetermined state change occurs on the power enable signal.

24. The mechanism of claim 21 wherein the logic for generating a power control output further comprises logic, responsive to the detection of a SLEEP command over the RS-232 receive line, configured to disable further operation of the mechanism until after a predetermined state change has occurred on the received power control signal.

* * * * *